(12) United States Patent
Mason et al.

(10) Patent No.: US 12,196,070 B2
(45) Date of Patent: Jan. 14, 2025

(54) DEPLOYING ACOUSTIC TELEMETRY EQUIPMENT

(71) Applicant: ACOUSTIC DATA LIMITED, Eden Island (SC)

(72) Inventors: Guy Harvey Mason, Eden Island (SC); Mark Clifton Tolley, Eden Island (SC); Matthew John Norgate, Eden Island (SC); Jesse Samuel Tolley, Eden Island (SC)

(73) Assignee: Acoustic Data Limited, Eden Island (SC)

( * ) Notice: Subject to any disclaimer, the term of this patent is extended or adjusted under 35 U.S.C. 154(b) by 100 days.

(21) Appl. No.: 17/924,514

(22) PCT Filed: May 5, 2021

(86) PCT No.: PCT/IB2021/053785
§ 371 (c)(1),
(2) Date: Nov. 10, 2022

(87) PCT Pub. No.: WO2021/229369
PCT Pub. Date: Nov. 18, 2021

(65) Prior Publication Data
US 2023/0184079 A1 Jun. 15, 2023

(30) Foreign Application Priority Data
May 11, 2020 (GB) .................................. 2006904

(51) Int. Cl.
*E21B 44/00* (2006.01)
*E21B 47/14* (2006.01)
*H04B 11/00* (2006.01)
*H04B 17/309* (2015.01)

(52) U.S. Cl.
CPC .............. *E21B 44/00* (2013.01); *E21B 47/14* (2013.01); *H04B 11/00* (2013.01); *H04B 17/309* (2015.01)

(58) Field of Classification Search
CPC ........ E21B 47/12; E21B 47/125; E21B 47/13; E21B 47/138; E21B 47/14; E21B 47/16; E21B 44/00; H04B 17/309; H04B 11/00
See application file for complete search history.

(56) References Cited

U.S. PATENT DOCUMENTS

| 7,546,094 B2 * | 6/2009 | Couper .................. H04B 7/155 |
| | | 455/13.1 |
| 10,415,376 B2 * | 9/2019 | Song ..................... E21B 47/005 |

(Continued)

FOREIGN PATENT DOCUMENTS

| CN | 107339077 B | 6/2019 |
| WO | 2012131600 A1 | 10/2012 |
| WO | WO-2015155617 A1 * | 10/2015 ............. E21B 23/01 |

OTHER PUBLICATIONS

Corresponding International Search Report for Patent Application No. PCT/IB2021/053785, mailed Aug. 30, 2021. 8 pages.
(Continued)

*Primary Examiner* — Franklin D Balseca
(74) *Attorney, Agent, or Firm* — Cooper Legal Group LLC

(57) ABSTRACT

A setting tool is disclosed for setting an acoustic telemetry unit in tubing, such as wellbore tubing. The setting tool comprises an anchor motor for driving an expandable anchor, a control unit for controlling the anchor motor, and an acoustic receiver. The control unit is arranged to determine whether an acoustic signal is successfully received by the acoustic receiver and to control the anchor motor in dependence thereon. By providing the setting tool with the acoustic receiver and determining whether an acoustic signal (Continued)

is successfully received by the acoustic receiver, it can be judged whether an acoustic signal from another acoustic telemetry unit in the tubing can be successfully received by the acoustic telemetry unit which is being set. This may facilitate deployment of a repeater unit at an optimum distance from another acoustic telemeter unit which is already in the tubing.

20 Claims, 7 Drawing Sheets

(56) References Cited

U.S. PATENT DOCUMENTS

| | | |
|---|---|---|
| 2009/0003133 A1 | 1/2009 | Dalton et al. |
| 2014/0008083 A1 | 1/2014 | Ring et al. |
| 2015/0275618 A1 | 10/2015 | Clemens et al. |
| 2017/0350237 A1 | 12/2017 | Giem et al. |
| 2018/0149018 A1* | 5/2018 | Hered .................... E21B 34/14 |
| 2018/0248584 A1 | 8/2018 | Nguyen et al. |

OTHER PUBLICATIONS

Corresponding UKIPO Search Report for application No. GB2006904. 3, mailed Jan. 21, 2021, 5 pages.
Corresponding Written Opinion for Patent Application No. PCT/IB2021/053785, dated Nov. 18, 2021, 11 pages.

* cited by examiner

DEPLOYING ACOUSTIC TELEMETRY EQUIPMENT

The present invention relates to techniques for deploying acoustic telemetry equipment in tubular structures, and in particular tubular structures found in wellbores.

In the oil and gas industry it is often desirable to sense downhole parameters and to transmit the sensed data to the surface. To this end, sensors, such as pressure, density and temperature sensors, are commonly deployed in bore holes using a number of methods and the data is retrieved in a variety of ways including acoustic transmission between the subterranean sensor and a surface data acquisition system. The acoustic method involves sending a series of coded sound signals via the materials lining the wellbore and may require repeater stations deployed at different intervals.

In some cases, tubulars, such as production tubing, are permanently deployed into the borehole and fixed in place. At a subsequent time, it may be desirable to lower a sensor unit into the borehole and anchor it in place, in order to collect data and transmit it to surface acoustically. Sometimes one or more repeater units must also be lowered into position and anchored in place within the borehole. For economic and logistical reasons, the assemblies are often lowered into the well on a plain mechanical wire. Various systems have been devised for deploying and/or retrieving a mechanical or electro-mechanical anchor.

One such system is described in WO 2015/155617, the subject matter of which is incorporated herein by reference. In such a system, a sensor unit, an acoustic transmitting/repeating unit, a mechanical anchor and an anchor motor drive/timer are deployed into the wellbore to a given depth. After a pre-programmed delay, the anchor motor turns using batteries and the mechanical anchor is deployed. The motor assembly can then be released, either automatically or by providing a high axial force on the deployment cable in order to shear a weak link or similar release mechanism. The sensor and acoustic transceiver are left in the wellbore attached the anchor. The anchor keeps the acoustic device from falling down the wellbore and also makes good acoustic contact with the metal tubulars that line the wellbore.

One or more repeater units may then be lowered down and fastened in a similar manner. The repeater units boost the signal strength and ensure reliable transmission over longer distances. The required number of repeater units and their linear separation will depend on how much the particular wellbore attenuates or distorts the acoustic signal whilst it passes along the length of the wellbore.

Some theoretical and empirical models exist for predicting the acoustic transmission performance of a wellbore. However, it is difficult to accurately predict the optimum position of the repeater units without making prior acoustic surveys of the actual wellbore selected for deployment. Such surveys are expensive and time consuming, and may result in temporary loss of well bore usage whilst the survey is carried out. Similarly, using too many repeater units increases capital cost and potential for failure, while too few may result in loss of signal.

It would therefore be desirable to provide techniques which can help to optimise the linear separation of the acoustic repeater units without the additional cost of a complete well survey or the use of electronic communications cables between the surface and the repeater.

According to one aspect of the present invention there is provided apparatus for setting an acoustic telemetry unit in tubing, the apparatus comprising:
an anchor motor for driving an expandable anchor;
a control unit for controlling the anchor motor; and
an acoustic receiver,
wherein the control unit is arranged to determine whether an acoustic signal is successfully received by the acoustic receiver and to control the anchor motor in dependence thereon.

The present invention may provide the advantage that, by providing the apparatus with an acoustic receiver, and determining whether an acoustic signal is successfully received by the acoustic receiver, it can be judged whether an acoustic signal from another acoustic telemetry unit in the tubing can be successfully received by the acoustic telemetry unit which is being set. This may facilitate deployment of a repeater unit at an optimum distance from another acoustic telemeter unit (for example, a sensor unit or another repeater unit) which is already in the tubing.

In order to determine whether an acoustic signal is successfully received by the acoustic receiver, the control unit may be arranged to determine whether a quality measure of the signal exceeds a predetermined threshold. The quality measure may be, for example, one of signal amplitude and signal-to-noise ratio. However, any other quality measure such as distortion (for example total harmonic distortion) or signal-to-noise-plus-interference ratio, or any combination of measures, could be used instead.

The control unit is preferably arranged to control the anchor motor to drive the expandable anchor radially outwards, preferably so as to grip a side of the tubing. This can allow the acoustic telemetry unit to be set in the tubing.

In one embodiment, the acoustic receiver is arranged to receive acoustic signals which have been transmitted through the tubing. For example, the acoustic receiver may be arranged to receive signals which have been transmitted through the tubing by another acoustic telemetry unit. This can allow the apparatus to determine whether an acoustic signal can be successfully received through the tubing from another acoustic telemetry unit which is already in the tubing.

In another embodiment, the acoustic receiver is arranged to receive acoustic signals which have been transmitted by the acoustic telemetry unit which is being set. For example, the acoustic telemetry unit which is being set (and to which the apparatus is attached) may be arranged to receive signals which have been transmitted through the tubing by another acoustic telemetry unit, and to retransmit those signals. In that case, the retransmitted acoustic signals may be received by the acoustic receiver. For example, since the apparatus is attached to the acoustic telemetry unit, the retransmitted acoustic signals may be transferred through a housing and/or other parts of the assembly and be received by the acoustic receiver. This can allow the apparatus to determine whether the acoustic telemetry unit has been able to receive and retransmit the acoustic signals from another acoustic telemetry unit. Furthermore, this may allow the apparatus to use a simpler and lower cost acoustic receiver than would otherwise be the case, since it may only need to receive locally generated acoustic signals. This may help to lower the cost and complexity of the apparatus.

Preferably the control unit is arranged to determine whether an acoustic signal is successfully received by the acoustic receiver after controlling the anchor motor to drive the expandable anchor radially outwards. This can allow the apparatus to determine whether an acoustic signal can be successfully received from the tubing via the anchor.

Preferably the control unit is arranged to control the anchor motor to contract the expandable anchor if it is determined that an acoustic signal is not successfully received by the acoustic receiver. This may be achieved, for example, by running the anchor motor in the opposite direction to that required to expand the anchor. This can allow the anchor to release its grip on the tubing, which can allow the apparatus to then be moved to a different position in the tubing.

In the case where the expandable anchor has been contracted, the control unit may be arranged to wait a predetermined amount of time after having contracted the anchor, and then to control the anchor motor to drive the expandable anchor radially outwards. Waiting a predetermined amount of time can allow time for the apparatus to be redeployed to another position in the tubing. The predetermined amount of time may be fixed or programmed into the apparatus by an operator. Expanding the anchor radially outwards can then allow the anchor to grip the side of the tubing in the new position. The control unit may then be arranged to determine whether an acoustic signal is successfully received by the acoustic receiver after having contracted and expanded the anchor (i.e. when it may be assumed that the apparatus is in a new position).

The above process may be repeated until an acoustic signal is successfully received by the acoustic receiver, or until a predetermined number of attempts have been made. Thus, the control unit may be arranged to repeat a process of expanding the anchor, determining whether an acoustic signal is successfully received by the acoustic receiver, contracting the anchor, and waiting for a predetermined time before expanding the anchor again. The process may be repeated, for example, until it is determined that an acoustic signal is successfully received by the acoustic receiver, or a predetermined number of attempts have been made, or a stop command is received.

Preferably the control unit does not cause the expandable anchor to contract if it is determined that an acoustic signal is successfully received by the acoustic receiver. In this case it may be assumed that the acoustic telemetry unit is able to receive an acoustic signal from another acoustic telemetry unit in the tubing, and thus in this case the acoustic telemetry unit may be left in place in the tubing.

Preferably the apparatus is connectable to a cable which can be lowered by a surface hoist. The apparatus is preferably of a type which is deployable using a cable which is not arranged for electronic communication with the surface. This can help to minimise the cost of the equipment while allowing the position of the acoustic telemetry unit to be optimised.

Preferably the apparatus is releasably attachable to the acoustic telemetry unit. For example, the apparatus may be attached to the acoustic telemetry unit using a weak link union, which may be arranged to break upon application of a predetermined tension. This can allow the apparatus to be detached from the acoustic telemetry unit when it is determined that an acoustic signal is successfully received. This in turn can allow the apparatus to be removed from the tubing, leaving the acoustic telemetry unit in place.

Preferably the acoustic telemetry unit comprises the expandable anchor. This can allow the acoustic telemetry unit to be fixed to the tubing using the anchor.

Preferably the acoustic telemetry unit comprises acoustic telemetry equipment. For example, the acoustic telemetry unit may be an acoustic repeater, which may be arranged to receive and to retransmit acoustic signals from another acoustic telemetry unit in the tubing. However, the apparatus may also be arranged to set a sensor unit which is not used as a repeater.

Preferably the tubing is tubing in a wellbore, such a production tubing or drilling tubing or any other type of tubing used oil or gas drilling or production.

Preferably the acoustic telemetry unit is arranged for acoustic telemetry through the tubing wall. However, the present invention may also be used for other types of acoustic telemetry through a wellbore.

In one embodiment, the control unit is arranged to detect a command in an acoustic signal received by the acoustic receiver. In this case, the control unit may be arranged to control a deployment process in dependence on the command.

For example, the acoustic telemetry unit (to which the apparatus is attached) may be arranged to detect a command signalled from the surface via pressure changes in the wellbore. The acoustic telemetry unit may then send a command to the apparatus by means of an acoustic signal, or any other appropriate means of communication. The control unit may be arranged to detect the command in the acoustic signal, and take the appropriate action. For example, the control unit may be arranged to reset or abort the deployment process. Such a feature could be used in the event that, for example, there had been an unforeseen event in the surface operations or change of business plan, or if deployment was unsuccessful. If desired, other commands, such as a command to reset or change one or more parameters of the deployment process, could be sent as well or instead.

According to another aspect of the present invention there is provided an assembly comprising an acoustic telemetry unit and apparatus in any of the forms described above. The assembly is preferably arranged to be lowered into the tubing using a cable.

The apparatus is preferably releasably attached to the acoustic telemetry unit, for example, using a weak link union. This can allow the apparatus to be detached from the acoustic telemetry unit by applying a tension to a cable which is used to lower the assembly into the tubing.

In any of the above embodiments the apparatus may be a setting tool for setting the acoustic telemetry unit in the tubing.

According to another aspect of the invention there is provided a setting tool for setting an acoustic telemetry unit in tubing, the setting tool comprising:
an anchor motor arranged to drive an expandable anchor;
a control unit arranged to control the anchor motor; and
an acoustic receiver,
wherein the control unit is arranged to:
  a) control the anchor motor to drive the expandable anchor radially outwards;
  b) determine whether an acoustic signal is successfully received by the acoustic receiver; and,
  c) if it is determined that an acoustic signal is not successfully received by the acoustic receiver:
    i. control the anchor motor to contract the expandable anchor; and
    ii. control the anchor motor to drive the expandable anchor radially outwards a predetermined time after the anchor has contracted.

Preferably, the control unit is arranged to repeat steps b) and c) until it is determined that an acoustic signal is successfully received, or a predetermined number of attempts have been made.

A corresponding surface hoisting arrangement may also be provided. Thus, according to another aspect of the present invention there is provided a hoisting arrangement for positioning a deployment assembly comprising a setting tool and an acoustic telemetry unit in tubing, the hoisting arrangement comprising:
- a hoist for operating a cable attached to the deployment assembly; and
- a hoist control unit for controlling the hoist, wherein the hoisting arrangement is arranged to:
  - a) lower the deployment assembly in the tubing;
  - b) apply a first tension to the cable;
  - c) determine whether the tension in the cable is maintained;
  - d) lower the deployment assembly to a new, lower position if the tension in the cable is not maintained; and
  - e) apply a second, higher tension if the tension in the cable is maintained.

The hoisting arrangement may be arranged to repeat steps b) through d) until the tension in the cable is maintained, or a predetermined number of attempts have been made.

Corresponding methods may also be provided. Thus, according to another aspect of the invention there is provided a method of setting an acoustic telemetry unit in tubing using a setting tool comprising:
an anchor motor which drives an expandable anchor;
a control unit which controls the anchor motor; and
an acoustic receiver, the method comprising:
- a) controlling the anchor motor to drive the expandable anchor radially outwards;
- b) determining whether an acoustic signal is successfully received by the acoustic receiver; and,
- c) if it is determined that an acoustic signal is not successfully received by the acoustic receiver:
  - i. controlling the anchor motor to contract the expandable anchor, and
  - ii. controlling the anchor motor to drive the expandable anchor radially outwards a predetermined time after the anchor has contracted.

Steps b) and c) may be repeated until it is determined that an acoustic signal is successfully received, or a predetermined number of attempts have been made.

Features of one aspect of the invention may be provided with any other aspect. Apparatus features may be provided as method features and vice versa.

Preferred features of the present invention will now be described, purely by way of example, with reference to the accompanying drawings, in which.

Figure 1:
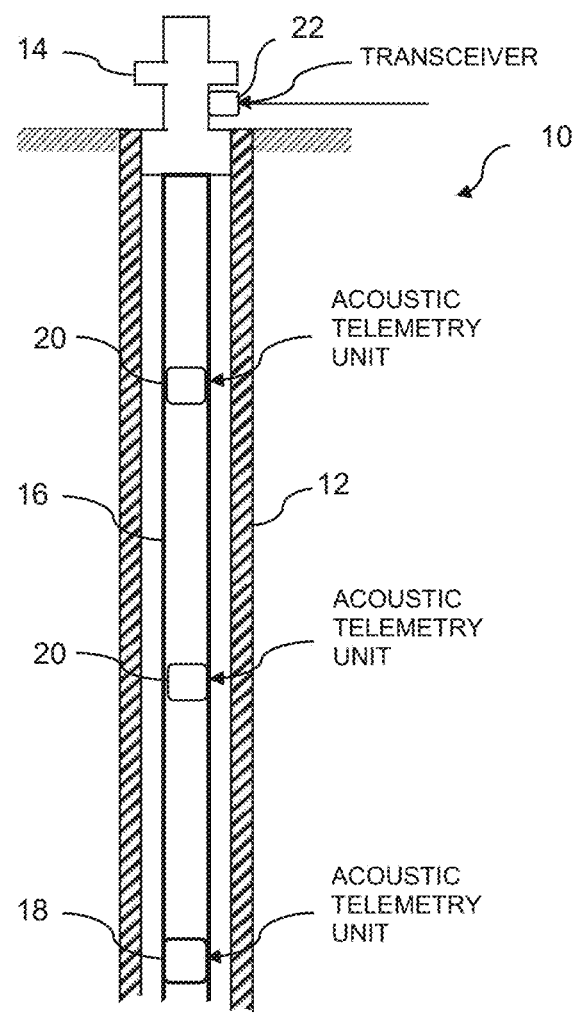
FIG. 1 shows an overview of a wellbore system.

FIG. 1 shows an overview of a wellbore system with which embodiments of the invention may be used. Referring to FIG. 1, the wellbore system comprises wellbore 10, casing 12, well head structure 14, tubing 16, a plurality of acoustic telemetry units 18, 20, and wellhead acoustic transceiver 22. In this example the tubing 16 is production tubing, although the principles described herein may be used with any type of tubing, such as drilling tubing or production tubing, which may be permanently or temporarily deployed in the wellbore.

The plurality of acoustic telemetry units includes a sensor unit 18 and repeater units 20. The sensor unit 18 includes sensors for sensing downhole parameters such as pressure, temperature and density, and an acoustic transceiver for transmitting sensor data as acoustic signals through the tubing 16 to the wellhead transceiver 22. The repeater units 20 are provided to compensate for the decreasing strength of the acoustic signal as it travels through the tubing. The repeater units 20 boost the strength of the acoustic signal and ensure reliable transmission. If desired, the repeater units 20 may also have sensors, and may transmit their own sensor data as well as repeating the sensor data of previous units. Furthermore, data and/or commands could also be sent from the wellhead transceiver 22 to one or more of the sensor unit 18 and the repeater units 20.

Each repeater unit 20 has an acoustic transceiver for receiving acoustic signals from the previous unit in the chain. When the repeater's acoustic transceiver successfully receives an acoustic signal from the previous unit, it will re-transmit it as a series of acoustic pulses and which will be received by the next repeater in the chain or the ultimate surface data logger. Any repeated data packet is altered to contain additional bytes that describe the origin of the data and the address of the repeater unit; hence a repeated signal and an original signal can be distinguished.

Wellbore acoustic transmission systems of the type described above are known generally in the art and are described, for example, in WO 2012/131600 and US 2009/0003133, the subject matter of both of which is incorporated herein by reference.

Figure 2:
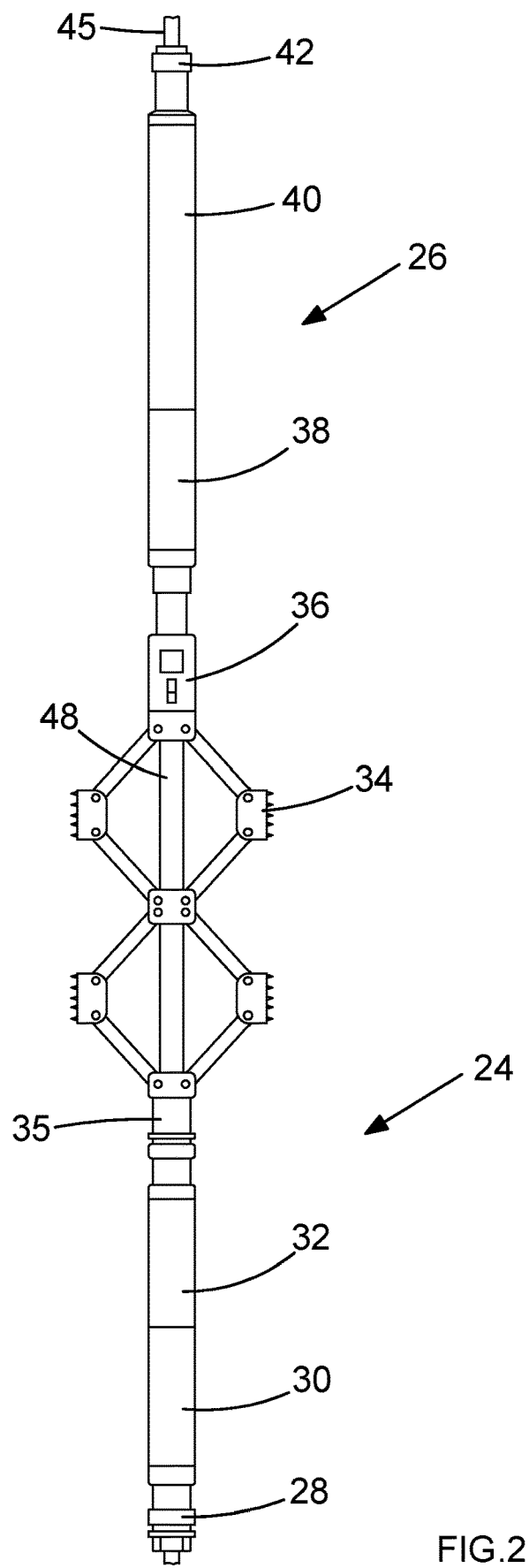
FIG. 2 shows parts of a deployment assembly in an embodiment of the invention.

FIG. 2 shows parts of a deployment assembly in an embodiment of the invention. Referring to FIG. 2, the deployment assembly comprises an acoustic telemetry unit 24 and a setting tool 26. The setting tool 26 is used to set the acoustic telemetry unit 24 at the appropriate location in the wellbore tubing. The acoustic telemetry unit 24 and the setting tool 26 are connected together by a weak link union 36. The acoustic telemetry unit 24 comprises sensor module 28, acoustic transceiver module 30, battery and communications module 32, and expandable anchors 34. The setting tool 26 comprises motor module 38, motor battery 40 and fishing head 42. The weak link union 36 contains a shear pin which shears when a large axial force is applied, allowing the setting tool 26 to be detached from the acoustic telemetry unit 24.

In operation, the motor module 38 in the setting tool 26 is arranged to drive a drive shaft 48 which passes through the expandable anchors 34. The drive shaft 48 has an external thread which engages with an internal thread on a collar 35 at the far end of the expandable anchors 34. Thus, rotation of the drive shaft 48 causes the anchors 34 to expand or contract, depending on the direction of rotation. The fishing head 42 is used to attach the setting tool to a deployment wire 45 which is connected to a surface hoist.

Figure 3:
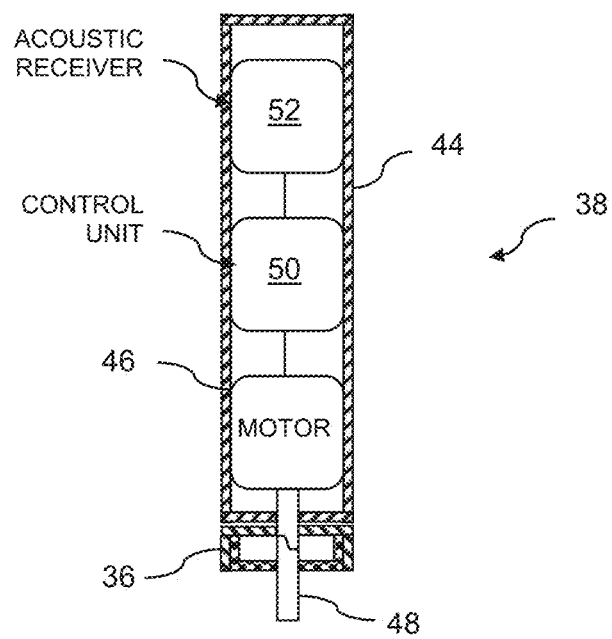
FIG. 3 shows parts of a motor module in a setting tool.

FIG. 3 shows parts of the motor module in more detail. Referring to FIG. 3, the motor module 38 comprises outer casing 44, anchor motor 46, control unit 50 and acoustic receiver 52. The anchor motor 46 is connected to the drive shaft 48 using a coupling mechanism. The coupling mechanism allows rotational motion to be transferred from the motor to the drive shaft, while allowing the two to be separated axially when the weak link union 36 is broken. The control unit 50 is arranged to receive signals from the acoustic receiver 52, and to control operation of the anchor motor 46. The acoustic receiver is acoustically coupled to the expandable anchors 34 via the outer casing 44 and the weak link union 36. The control unit 50 may be implemented as electronics, or as a processor and associated memory executing suitable software, or as a combination of the two.

Figure 4:
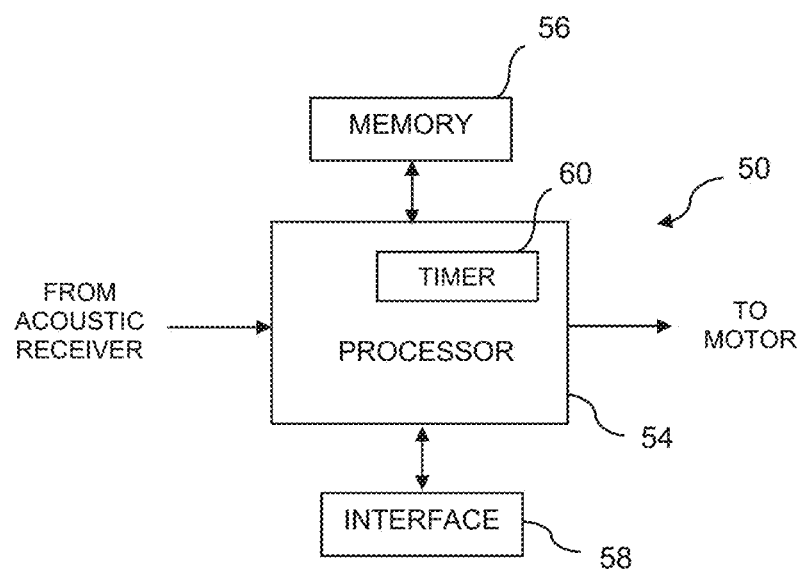
FIG. 4 shows parts of a control unit in a setting tool.

FIG. 4 shows parts of the control unit 50 in one embodiment. Referring to FIG. 4, the control unit 50 comprises a processor 54, memory 56 and an interface 58. The processor 54 includes a timer 60. The processor 54 is programmed with the appropriate software to perform the functions described below. The memory 56 is used to store data and software. The interface 58 allows the control unit 50 to be connected to an external device while it is at the surface. This can allow the commands and/or data to be transferred to and from the control unit.

Figure 5:
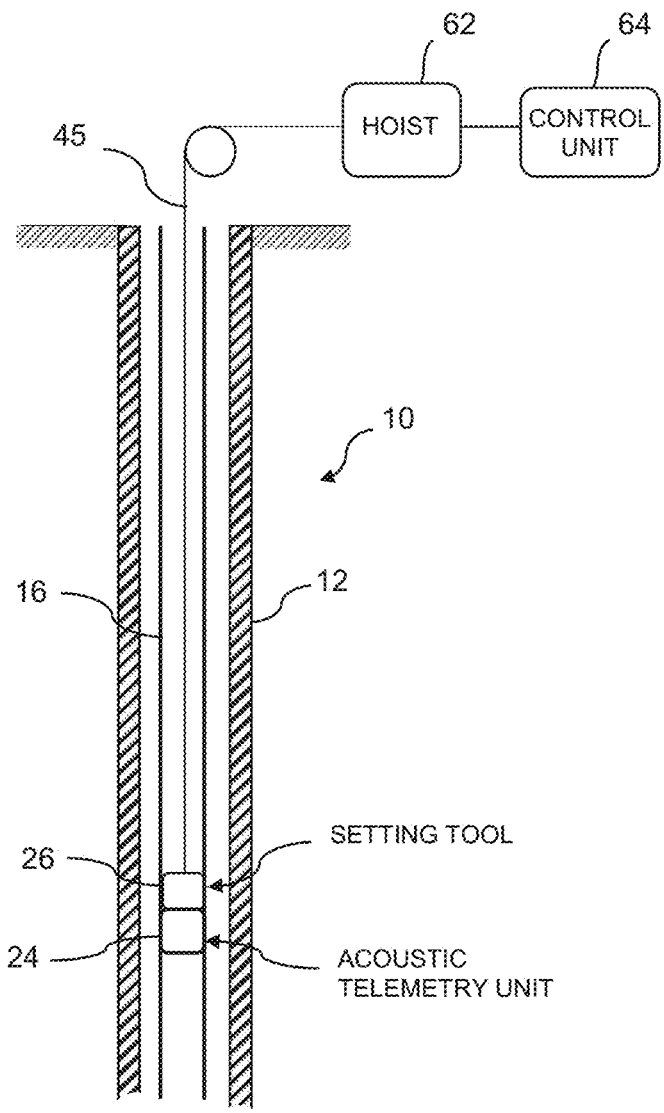
FIG. 5 illustrates a deployment assembly being deployed in a wellbore.

FIG. 5 illustrates the deployment assembly of FIGS. 2 to 4 being deployed in a wellbore. Referring to FIG. 5, the downhole unit 24 and setting tool 26 are lowered into tubing 16 in wellbore 10 using a deployment wire 45 which is connected to a surface hoist 62. The surface hoist 62 is controlled using a hoist control unit 64. The hoist control unit 64 may operate automatically, or under control of a human operator, or a combination of the two. The hoist control unit 64 may be implemented as electronics, or as a processor and associated memory executing suitable software, or as a combination of the two.

The arrangement shown in FIGS. 2 to 5 can be used to deploy successive acoustic telemetry units (sensor and/or repeater units) in a wellbore tubing, as will now be explained.

In a preferred embodiment the setting tool 26 has two modes. The first mode is used for deploying the first (lowest) sensor unit, and the second mode is used for deploying subsequent repeater units (which may or may not include sensors). Alternatively, a separate setting tool could be used in each case.

Prior to deploying the first sensor unit, the setting tool is set to the first mode. A delay greater than the time that will be taken to lower the deployment assembly to the required depth is programmed into the control unit 50 in the setting tool. The setting tool 26 is then attached to the sensor unit 24 using the weak link union 36. The setting tool is attached to the deployment wire 45 which is connected to the surface hoist 62. The surface hoist 62 then lowers the assembly, comprising downhole unit 24 and setting tool 26, into the tubing 16 until it is at the required depth in the well. After the programmed delay the control unit 50 starts the motor 46. The motor 46 then rotates, which causes the anchors 34 to expand until they bite into the internal surface of the tubing 16.

After a predetermined period of time, which is greater than the programmed delay plus the time taken for the anchors to expand, the surface hoist 62 applies a high tension to the deployment cable 45. This causes the weak link unit 36 to be broken, freeing the setting tool 26 from the downhole sensor unit 24. The setting tool 26 is then withdrawn from the hole, leaving the sensor unit 24 safely fixed to the tubing 16 on the expanded anchors 34. After a pre-programmed delay the electronics in the sensor unit will start collecting sensor data and transmitting it through the tubing in the form of acoustic pulses.

At the surface, the setting tool 26 is then set to the second (repeater) mode. A second similar acoustic telemetry unit (a repeater unit that may or may not contain a sensor) is then connected to the setting tool 26. The new assembly is then lowered into the borehole to approximately the correct depth, for example, the maximum theoretical separation from first unit so as to be on the limits of a good signal. After a programmed delay (which may be the same as or different from the programmed delay in the first mode) the control unit 50 starts the motor 46 and the anchor 34 is deployed, as was the case with the first unit.

After a predetermined period of time, which is greater than the programmed delay plus the time taken for the anchors to expand, the surface hoist 62 applies a small amount of tension to the hoist cable 45. The amount of tension applied is less than that required to break the weak link 36, but sufficient to cause some stretching of the cable and to raise the deployment assembly if the anchors are not deployed. For example, a tension of around 100 kg above normal tension may be suitable, although of course other values could be used instead depending on factors such as the weight and depth of the deployment assembly. The hoist operator is able to verify that the anchor has been successfully deployed if the tension in the cable is maintained.

Once the anchors have deployed, the acoustic receiver 52 in the setting tool 26 is acoustically coupled to the tubing 16 through the anchors 34, weak link union 36 and the motor module outer casing 44. Thus, the acoustic receiver 52 is able to receive any acoustic signals which have been transmitted through the tubing by the first downhole unit. These acoustic signals are converted to electrical signals, demodulated, and passed to the control unit 50.

The control unit 50 monitors the received signals (if any) from the acoustic receiver 52 and determines whether they are of sufficient quality to allow the acoustic transceiver unit 30 in the repeater unit to successfully receive, possibly decode, and re-transmit the acoustic signals from the first downhole unit. This can be done by comparing the amplitude of the signals from the acoustic receiver 52 with a predetermined threshold, or by comparing the signal-to-noise ratio with a predetermined threshold. If the control unit 50 determines the signals are of sufficient quality, then it takes no action, and the anchors 34 remain deployed.

If on the other hand the control unit 50 does not observe a signal of sufficient quality from the first unit within a pre-determined amount of time, then it powers up the motor 46 and runs it backwards. This causes the drive shaft 48 to turn in the opposite direction to that during deployment of the anchors. This in turn causes the anchors to contract, releasing their grip on the tubing wall. Since the deployment cable 45 is under tension, releasing the anchors causes the assembly to rise, releasing the tension in the cable. The control unit 50 then waits another predetermined period of time before starting the motor 46 again in the forwards direction and redeploying the anchors 34. The process is repeated until a signal of sufficient quality is observed, or a predetermined number of attempts have been made without success.

At the surface, the hoist operator monitors the tension in the cable 45. If after a predetermined amount of time (a time greater than that required to deploy the anchors, test the signal, and if necessary release the anchors) the hoist operator observes a constant overpull, then the operator will consider the deployment to be successful. The tension in the cable is then increased further to break the weak link union 36, and the setting tool 26 is removed from the well.

If on the other hand the anchors 34 have contracted to release their grip on the tubing wall, then at the surface, the hoist operator will see this as a reduction in hoist wire tension as the wire stretch is released and the deployment assembly is dragged up the well slightly. The hoist operator is therefore alerted to the fact that the second unit has not repeated a signal from the first unit, indicating that the signal attenuation is high or signal-to-noise ratio was too low across the section of the wellbore between the first (sensor) unit and the second (repeater) unit.

The hoist operator now has a pre-programmed amount of time before the control unit 50 will re-deploy the anchor and repeat the sequence. During this time the hoist operator lowers the assembly by an amount sufficient to take it to a new position lower than the original position and closer to the first unit. The amount by which the assembly is lowered is a trade-off between cost (more units closely spaced) and signal quality and also the operational time required to optimise the complete system. In one example, the assembly is lowered by a depth of approximately 100 m, although of course other values could be used instead. The hoist operator then awaits the repeated process in the new position. This process is repeated until the second unit is able to repeat the signal from the first unit (or until a predetermined number of attempts have been made without success).

Subsequent repeater units can then be deployed in a similar way, with each new repeater unit monitoring the signals received from the preceding repeater unit. In this way the positions of the repeater units can be optimised to maximise distance and minimise costs.

In the arrangement described above, the acoustic receiver 52 in the setting tool 26 is arranged to receive acoustic signals which have been transmitted from the preceding downhole acoustic telemetry unit through the tubing 16. In an alternative embodiment, the acoustic receiver 52 is arranged to receive acoustic signals which have been transmitted by the acoustic transceiver module 30 in the repeater unit 24 to which the setting tool is attached.

Once the anchors have deployed, the acoustic transceiver module 30 in the repeater unit 24 is acoustically coupled to the tubing 16 through the anchors 34. Thus, the entire repeater unit 24 may receive signals from the first downhole unit 18, if they are of sufficient quality. If successful, the repeater unit 24 will re-transmit those signals. The re-transmitted signals will then be received by the acoustic receiver 52 in the setting tool 26 via the anchors 34, weak link union 36 and the motor module outer casing 44. If the acoustic receiver 52 is able to receive any acoustic signals from the local transceiver module 30, then the acoustic signals already received and repeated by 30 were of adequate quality to be repeatable. These acoustic signals are converted to electrical signals, demodulated, and passed to the control unit 50.

The control unit 50 monitors the received signals (if any) from the acoustic receiver 52. If the received signals are of sufficient quality and not erroneous, then it takes no action, and the anchors 34 remain deployed. If on the other hand the control unit 50 does not observe a signal from the preceding acoustic telemetry unit via the repeater unit 24 within a pre-determined amount of time, then it powers up the motor 46 and runs it backwards to release the anchors. The deployment process then proceeds in the manner described above.

In this embodiment, the setting tool can use a simpler and lower cost acoustic receiver than would otherwise be the case, since it only needs to receive locally generated acoustic signals.

Figure 6:
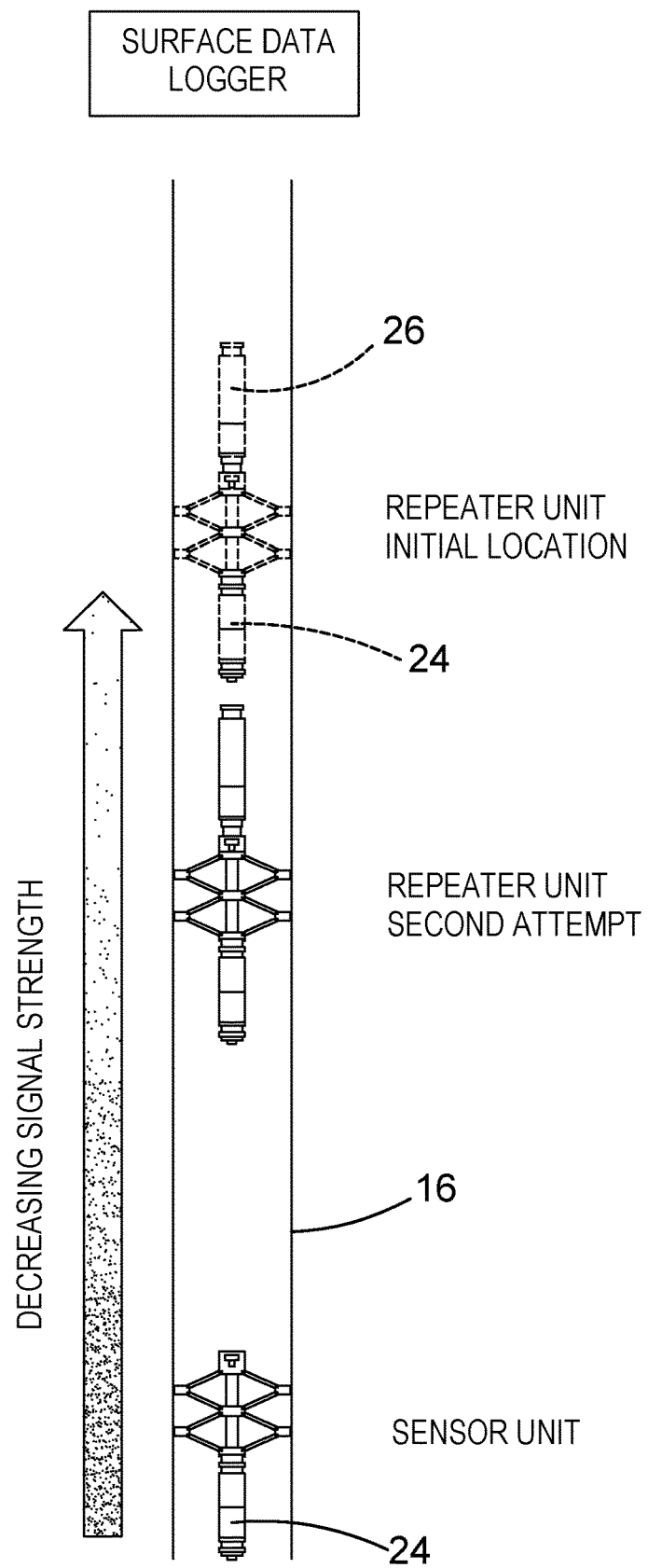
FIG. 6 illustrates the process of setting an acoustic telemetry unit in a wellbore.

FIG. 6 illustrates the process of setting an acoustic telemetry unit in a wellbore. Referring to FIG. 6, a sensor unit 24 is first deployed at the desired location in tubing 16 in the manner described above. After a certain period of time the sensor unit starts collecting sensor data and transmitting it through the tubing 16 in the form of sonic pulses. The strength of the acoustic signal from the sensor unit decreases with distance through the tubing.

A deployment assembly comprising a repeater unit 24 and a setting tool 26 is then deployed at an initial location in the well. The initial location may be calculated, for example, based on the maximum theoretical separation from first unit so as to be on the limits of a good signal. In this example, the initial location is unsuccessful, as the acoustic receiver in the setting tool is unable to receive a signal of sufficient strength from the sensor unit. The deployment assembly is then moved at a second, lower, location in the wellbore. In this example, the acoustic receiver in the setting tool is able to receive a signal of sufficient strength from the sensor unit when in the second position. Thus the second attempt at positioning the repeater unit is deemed to be successful. The setting tool 26 is then separated from the repeater unit, leaving the repeater unit 24 in place in the second successful position.

Figure 7:
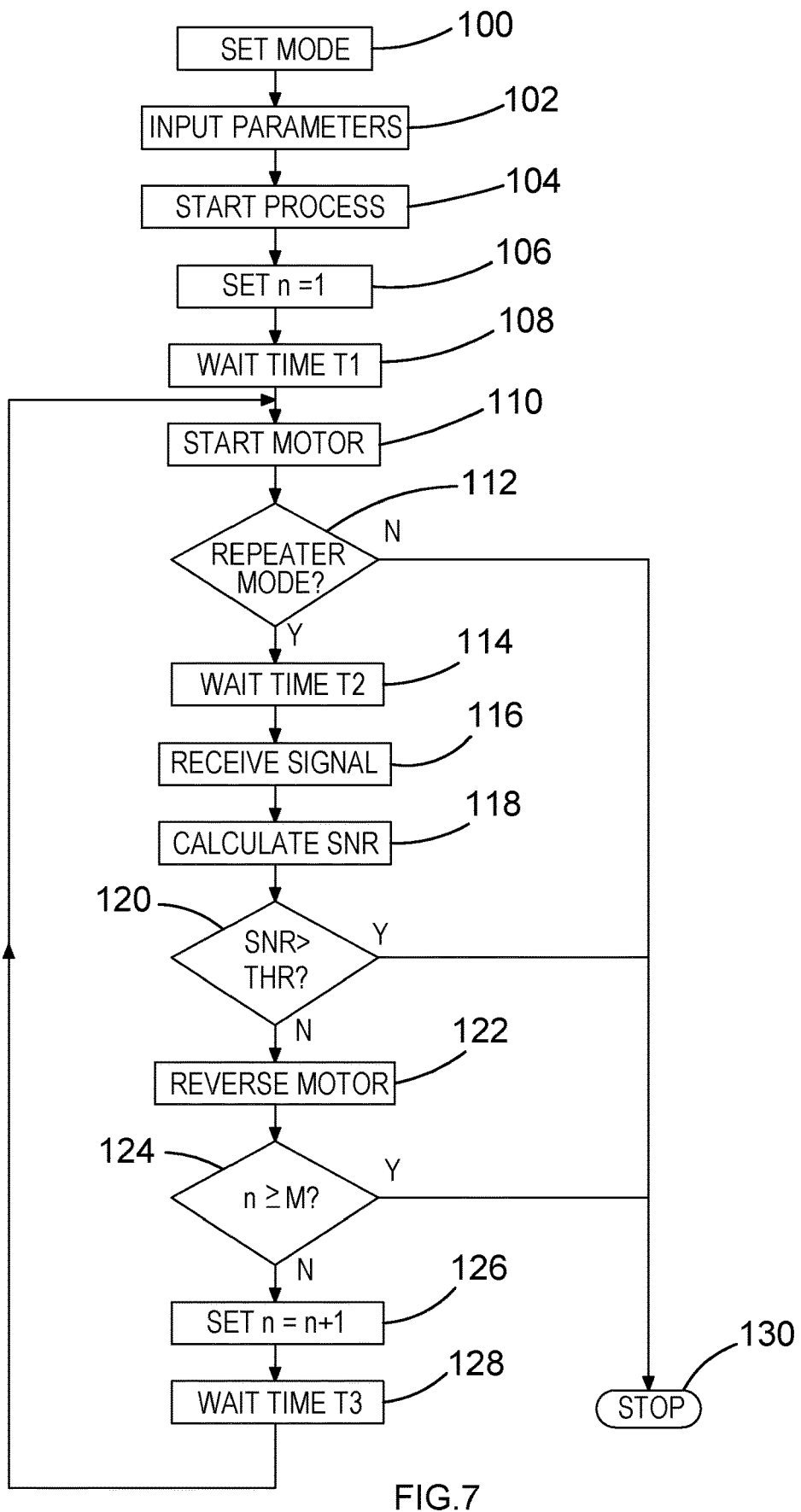
FIG. 7 illustrates steps carried out by a control unit in a setting tool in one embodiment.

FIG. 7 illustrates steps carried out by the control unit 50 in a setting tool in one embodiment. It is assumed that the setting tool is initially at the surface. Referring to FIG. 7, in step 100 the control unit receives an input indicating whether it is to operate in sensor mode or repeater mode. The input may be received from an external device via the interface 58, or via a user interface on the setting tool itself. Sensor mode is set when the first sensor unit is being deployed, and repeater mode is set when subsequent repeater units are being deployed. The control unit then sets a flag in memory indicating the mode. Optionally, in step 102, other parameters such as one or more of the various time delays, thresholds and/or the maximum number of attempts described below may also be received and stored in memory. Alternatively, these parameters may be fixed values or previously set values.

Once the setting tool is connected to the acoustic telemetry unit, in step 104 the deployment process is started. In step 106 the number of attempts n is set to 1.

The deployment assembly comprising the setting tool and acoustic telemetry unit is then lowered into position.

In step 108, the control unit waits for a period of time equivalent to a delay time T1. The value of T1 is stored in memory and is greater than the amount of time which will be taken for the deployment assembly to be lowered into position. Then, in step 110, the control unit starts the motor 46. This causes the anchors 34 to expand until they bite into the internal surface of the tubing 16.

In step 112 the control unit checks whether it is in repeater mode. This is done by checking the flag stored in memory indicating the mode. If the control unit is not in repeater mode, indicating that the first sensor unit is being deployed, then in step 130 the process stops. In this case the setting tool will be detached from the sensor unit and lifted to the surface.

If on the other hand the control unit is in repeater mode, then in step 114 it waits for a further time period T2. The value of T2 is stored in memory and is a value which is sufficient to allow the anchors to expand. Then, in step 116, the control unit receives a signal (if any) from the acoustic receiver 52 in the setting tool.

In step 118, the control unit calculates the signal-to-noise ratio of the signal (if any) which it receives from the acoustic receiver 52. In step 120 the control unit compares the signal-to-noise ratio to a threshold THR. The value of THR is stored in memory and is a value of signal-to-noise ratio above which it is assumed that the repeater unit can successfully repeat the signal which is received from the preceding downhole unit. If the control unit determines that the signal-to-noise ratio is greater than the threshold, then the process stops at step 130. The setting tool is then detached from the repeater unit and lifted to the surface.

If on the other hand the control unit determines that the signal-to-noise ratio is less than the threshold, then in step 122 it reverses the motor 46. This causes the anchors 34 to contract and to release their grip on the tubing wall.

In step 124 the control unit determines whether the number of attempts n is equal to or greater than the maximum number of attempts M. The value of M is stored in memory and may be either fixed or set by the operator. If it is determined that the number of attempts is equal to or greater than the maximum, then the process stops in step 130. In this case there is likely to be a fault somewhere in the system and the appropriate remedial action can be taken.

If the number of attempts is less than the maximum, then in step 126 the number of attempts n is incremented by 1. Then in step 128 the control unit waits for a period of time T3. The value of T3 is stored in memory and is a value which is sufficient for the hoist operator to lower the deployment assembly to a new, lower position. Processing then returns to step 110, and the deployment attempt is repeated in the new position.

Figure 8:
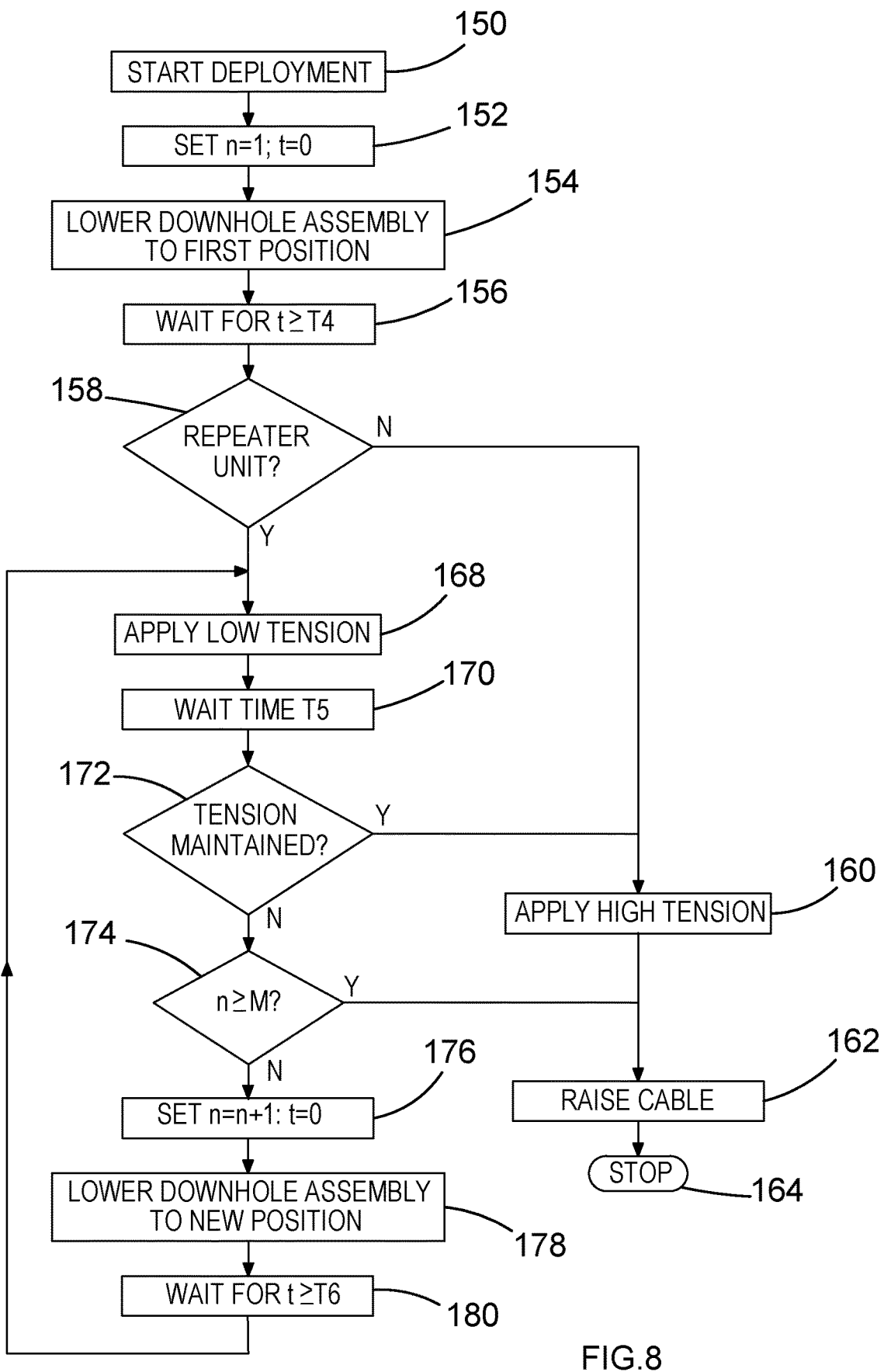
FIG. 8 illustrates steps carried out by a surface hoist and hoist control unit in one embodiment.

FIG. 8 illustrates steps carried out by the surface hoist 62 and hoist control unit 64 in one embodiment. It is assumed that a setting tool 26 has been attached to an acoustic telemetry unit 24 using a weak link union 36, and a cable 45 has been attached to the setting tool. The acoustic telemetry unit may be either a sensor unit or a repeater unit.

Referring to FIG. 8, in step 150 the deployment process is started. In step 152 the number of attempts n is set to 1 and the value of a timer t is set to zero. In step 154 the cable is let out and the deployment assembly (comprising setting tool and acoustic telemetry unit) is lowered in the borehole to the first position. In step 156 it is determined whether the elapsed time t is greater than or equal to a value T4. T4 is a period of time slightly greater than the time taken to lower the deployment assembly and for the control unit and motor in the setting tool to expand the anchors to grip the tubing.

In step 158 it is determined whether the acoustic telemetry unit is a repeater unit or the first unit 18. If the unit is not a repeater unit, then in step 160 a high tension is applied to the cable. The applied tension is sufficient to cause the weak link union 36 to break, releasing the setting tool 26 from the acoustic telemetry unit 24. Then in step 162 the setting tool 26 is raised out of the borehole. The deployment process is then stopped in step 164, and the setting tool can be used to deploy a new acoustic telemetry unit.

If on the other hand the acoustic telemetry unit is a repeater unit, then in step 168 a low tension is applied to the cable. The applied tension is sufficiently low that the weak link union 36 will not break, but sufficiently high to lift the deployment assembly if the anchors are not gripping tubing wall. Then in step 170 the hoist operator waits for a time period T5. T5 is a period of time slightly greater than the time taken for the control unit 50 in the setting tool to determine whether an acoustic signal of sufficient quality has been received by the acoustic receiver 52, and if necessary to contract the anchors to release their grip on the tubing wall.

Then in step 172 the hoist operator determines whether the tension in the cable has been maintained. If the tension has been maintained (indicating that a signal of sufficient quality has been received) then in step 160 a high tension is applied to the cable, releasing the setting tool 26 from the acoustic telemetry unit 24. Then in step 162 the setting tool 26 is raised out of the borehole.

If on the other hand the tension in the cable has not been maintained, then in step 174 it is determined whether the number of attempts n is equal to or greater than the maximum number of attempts M. If it is determined that the number of attempts is equal to or greater than the maximum, then in step 162 the complete deployment assembly is raised out of the borehole. In this case there is likely to be a fault somewhere in the system and the appropriate remedial action can be taken.

If the number of attempts is less than the maximum, then in step 176 the number of attempts n is incremented by 1, and the timer t is reset to zero. Then in step 178 the deployment assembly is lowered to a new position which is lower than the previous position and closer to the preceding acoustic telemetry unit.

In step 180 it is determined whether the elapsed time t is greater than or equal to a value T6. The value of T6 is slightly greater than the period of time T3 programmed into the setting tool before it redeploys the anchors. Processing then returns to step 168 and the deployment attempt is repeated in the new position.

The steps described above may be carried out automatically by the surface hoist 62 and hoist control unit 64, or under control of a human operator, or any combination of the two.

In the embodiments described above, the tension in the deployment cable is used to indicate to the surface operator whether or not a repeater unit has been successfully deployed. In addition, it may be desirable for the operator to send data and/or commands to the downhole unit. For example, it may be desirable for the operator to send a command to the setting tool to reset or abort the pre-programmed deployment sequence.

It will be understood by those skilled in the art that the pressure in a subterranean wellbore where the fluids are flowing along the wellbore might be altered by restricting the flow rate along the surface pipework. For example, the flow rate might be increased, and the subterranean pressure decreased, by partially removing a restriction along the flow path at surface (or alternatively by opening a choke valve or other variable orifice). Given that the downhole unit 24 includes a sensor which might be a pressure sensor, manually perturbing the flow rates and pressures at surface in order to cause a pressure change downhole can be used to send simple commands to the downhole unit 24.

For example, the acoustic telemetry unit 24 may be arranged to detect the change in pressure using a pressure sensor in the sensor module 28, and then send a command to the setting tool 26 by means of an acoustic signal using the acoustic transceiver module 30. In this case, the acoustic signal may be received by the acoustic receiver 52 in the setting tool 26, and the control unit 50 may be arranged to detect the command and take the appropriate action. A practical example might be that the downhole unit reacts to an increase/decrease in pressure of say 10% over a 5-minute time period by resetting or aborting the pre-programmed sequence in FIG. 7. Such a feature could be used in the event that for example there had been an unforeseen event in the surface operations or change of business plan, or if deployment was unsuccessful.

As an alternatively, a wire communications link could be used between the acoustic telemetry unit 24 and the setting tool 26, which is arranged to sever when the weak link union 36 breaks.

Whilst more complex communications schemes can be envisaged there may be practical and economic considerations when applying them to a wellbore (for example reduced oil production).

The arrangements described above can help to optimise the linear separation of the acoustic repeaters without the additional cost of a complete well survey or the use of electronic communications cables between the surface and the repeater. In this way the positions of the repeater units can be optimised to maximise distance and minimise costs.

It will be appreciated that the above embodiments have been described by way of example only, and various modifications and variations will be apparent to the skilled person within the scope of the appended claims.

The invention claimed is:

1. An apparatus arranged to set an acoustic telemetry unit in tubing, the apparatus comprising:
   an anchor motor arranged to set the acoustic telemetry unit in the tubing;
   a control unit arranged to control the anchor motor; and
   an acoustic receiver,
   wherein the control unit is arranged to determine whether an acoustic signal is successfully received by the acoustic receiver after controlling the anchor motor to set the acoustic telemetry unit in the tubing and to control the anchor motor in dependence thereon.

2. The apparatus according to claim 1, wherein the control unit is arranged to determine whether a quality measure of the acoustic signal exceeds a predetermined threshold.

3. The apparatus according to claim 2, wherein the quality measure is one of signal amplitude or signal-to-noise ratio.

4. The apparatus according to claim 1, wherein the control unit is arranged to control the anchor motor to drive an expandable anchor radially outwards.

5. The apparatus according to claim 1, wherein the acoustic receiver is arranged to receive acoustic signals which have been transmitted through the tubing.

6. The apparatus according to claim 1, wherein the acoustic receiver is arranged to receive acoustic signals which have been transmitted by the acoustic telemetry unit.

7. The apparatus according to claim 1, wherein the control unit is arranged to determine whether the acoustic signal is successfully received by the acoustic receiver after controlling the anchor motor to drive an expandable anchor radially outwards.

8. The apparatus according to claim 1, wherein the control unit is arranged to control the anchor motor to release the acoustic telemetry unit from the tubing when it is determined that the acoustic signal is not successfully received by the acoustic receiver.

9. The apparatus according to claim 8, wherein the control unit is arranged to wait a predetermined amount of time after having released the acoustic telemetry unit from the tubing, and then to control the anchor motor to re-set the acoustic telemetry unit in the tubing.

10. The apparatus according to claim 9, wherein the control unit is arranged to determine whether the acoustic signal is successfully received by the acoustic receiver after having released and re-set the acoustic telemetry unit in the tubing.

11. The apparatus according to claim 1, wherein the control unit is arranged to repeat a process of setting the acoustic telemetry unit in the tubing, determining whether the acoustic signal is successfully received by the acoustic receiver, releasing the acoustic telemetry unit from the tubing, and waiting for a predetermined time, until it is determined that the acoustic signal is successfully received by the acoustic receiver or a predetermined number of attempts have been made.

12. The apparatus according to claim 1, wherein the control unit does not cause the anchor motor to release the acoustic telemetry unit from the tubing when it is determined that the acoustic signal is successfully received by the acoustic receiver.

13. The apparatus according to claim 1, wherein the apparatus is connectable to a cable which is configured to be lowered by a surface hoist.

14. The apparatus according to claim 1, wherein the apparatus is of a type which is deployable using a cable which is not arranged for electronic communication with the surface.

15. The apparatus according to claim 1, wherein the apparatus is releasably attachable to the acoustic telemetry unit.

16. The apparatus according to claim 1, wherein the acoustic telemetry unit comprises an anchor.

17. The apparatus according to claim 1, wherein the control unit is arranged to detect a command in the acoustic signal received by the acoustic receiver, and to control a deployment process in dependence on the command.

18. A setting tool for setting an acoustic telemetry unit in tubing, the setting tool comprising:
   an anchor motor arranged to set the acoustic telemetry unit in the tubing;
   a control unit arranged to control the anchor motor; and
   an acoustic receiver,
   wherein the control unit is arranged to:
   a) control the anchor motor to set the acoustic telemetry unit in the tubing;
   b) determine whether an acoustic signal is successfully received by the acoustic receiver; and
   c) when it is determined that the acoustic signal is not successfully received by the acoustic receiver:
      i. control the anchor motor to release the acoustic telemetry unit from the tubing; and
      ii. control the anchor motor to set the acoustic telemetry unit in the tubing a predetermined time after the acoustic telemetry unit has been released from the tubing.

19. The setting tool according to claim 18, wherein the control unit is arranged to repeat steps b) and c) until it is determined that the acoustic signal is successfully received, or a predetermined number of attempts have been made.

20. A method of setting an acoustic telemetry unit in tubing using a setting tool comprising:
   an anchor motor which sets the acoustic telemetry unit in the tubing;
   a control unit which controls the anchor motor; and
   an acoustic receiver,
   the method comprising:
   a) controlling the anchor motor to set the acoustic telemetry unit in the tubing;
   b) determining whether an acoustic signal is successfully received by the acoustic receiver; and,
   c) when it is determined that the acoustic signal is not successfully received by the acoustic receiver:
      i. controlling the anchor motor to release the acoustic telemetry unit from the tubing, and
      ii. controlling the anchor motor to set the acoustic telemetry unit in the tubing a predetermined time after the acoustic telemetry unit has been released from the tubing.

\* \* \* \* \*